Nov. 23, 1965  F. R. KISHLINE  3,219,138
ENGINE MOUNTING APPARATUS
Filed Sept. 9, 1963  3 Sheets-Sheet 1
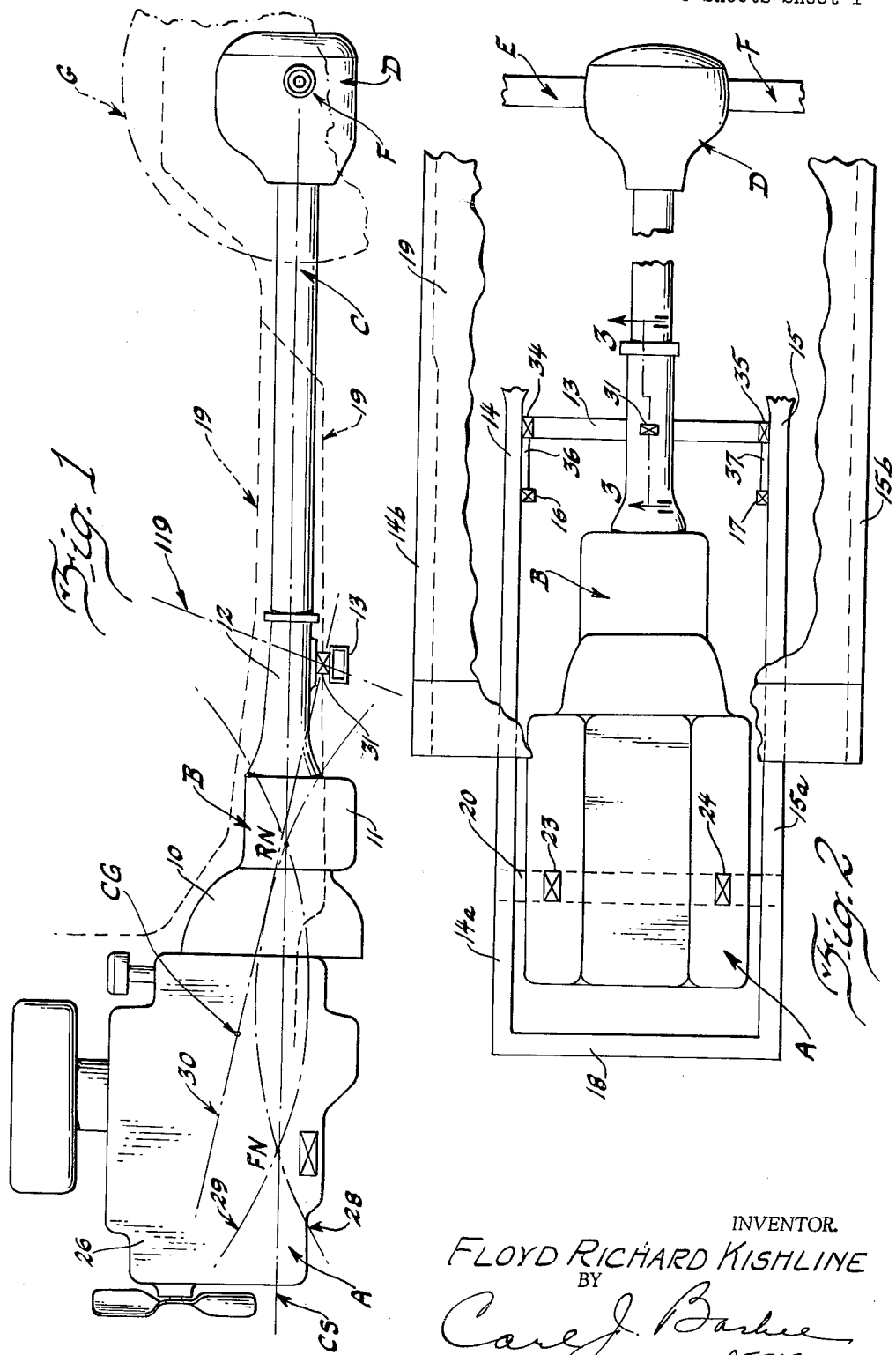
INVENTOR.
FLOYD RICHARD KISHLINE
BY
Carl J. Barker
ATTORNEY

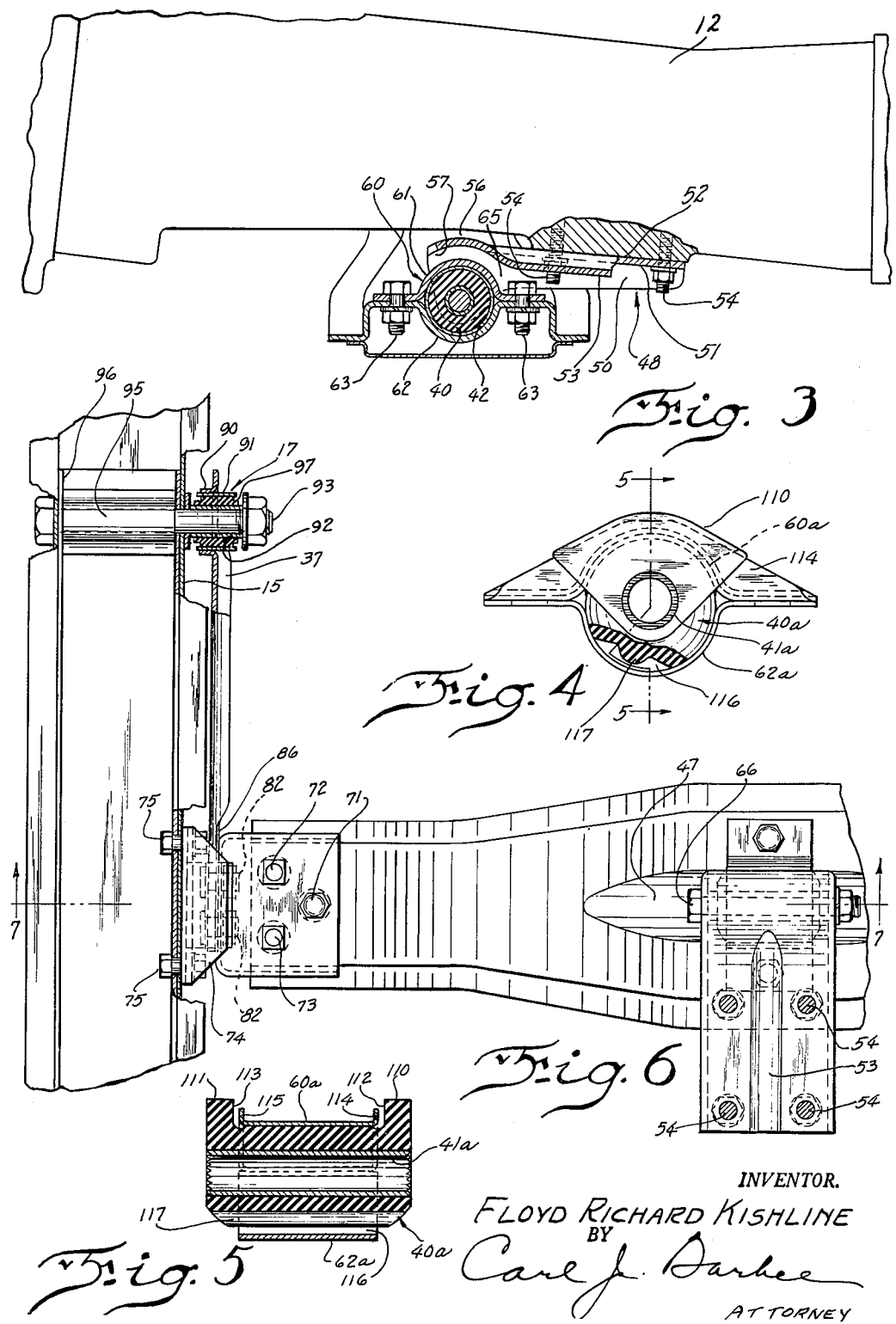

Nov. 23, 1965   F. R. KISHLINE   3,219,138
ENGINE MOUNTING APPARATUS
Filed Sept. 9, 1963   3 Sheets-Sheet 3
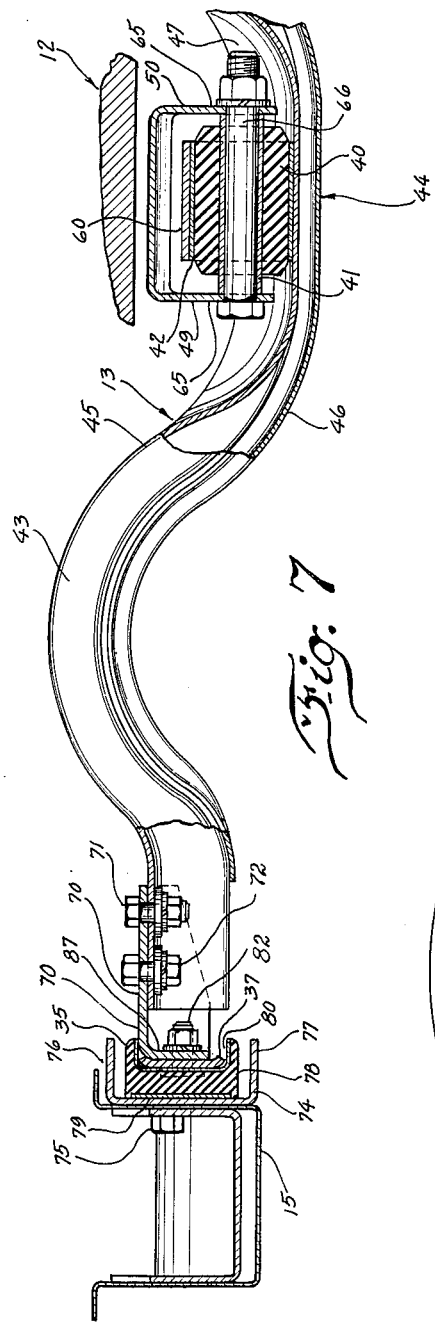
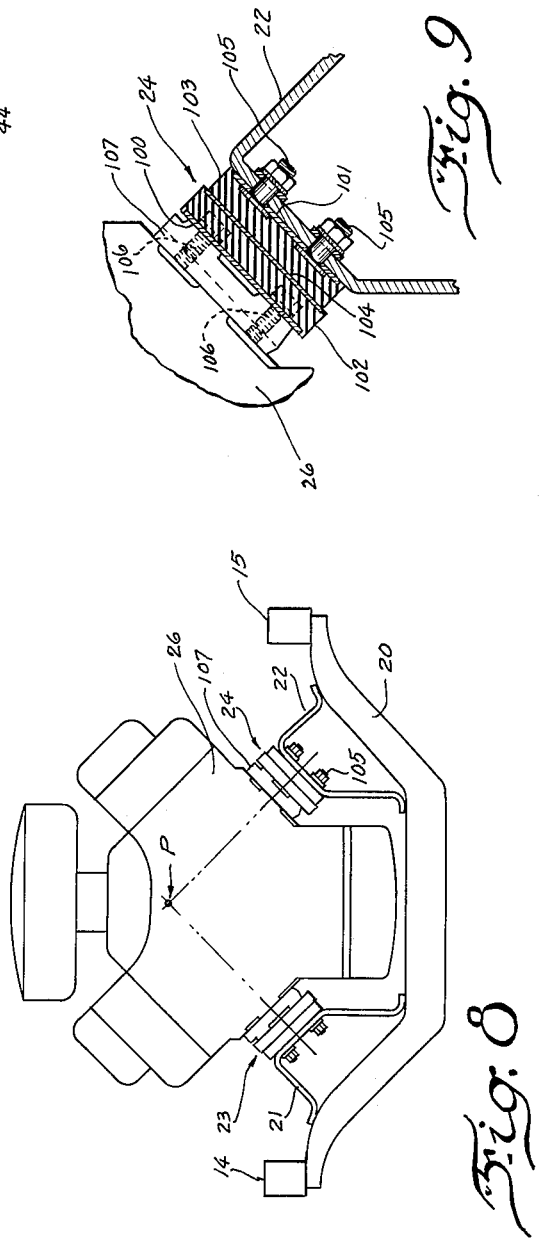
INVENTOR.
FLOYD RICHARD KISHLINE
BY
Carl J. Barbee
ATTORNEY

United States Patent Office 3,219,138
Patented Nov. 23, 1965

3,219,138
ENGINE MOUNTING APPARATUS
Floyd Richard Kishline, Kenosha, Wis., assignor to American Motors Corporation, Kenosha, Wis., a corporation of Maryland
Filed Sept. 9, 1963, Ser. No. 307,654
10 Claims. (Cl. 180—57)

The invention relates to automotive vehicles and in particular to the apparatus for mounting the engine and associated drive train with reference to the body.

Certain terminology employed hereinafter shall have the following definitions accorded thereto. "Engine housing" will be understood to include the stationary components of the engine, such as the cylinder block, cylinder head, oil pan, cylinder head covers, etc. The term "engine" will be understood to include the "engine housing" together with movable components such as the crankshaft, cam shaft, pistons, etc. The term "drive train housing" will be understood to mean the stationary components extending from the "engine housing'" to the torque tube or propeller shaft housing, and including the clutch housing, transmission housing, and transmission adapter or extension housing. "Drive train" will be understood to include the "drive train housing" as well as the movable or driving components contained therein and situated between the engine crankshaft and the propeller shaft (such as the clutch, transmission gearing and any additional auxiliary driving mechanism). "Engine mounts" will be understood to include all of the mountings utilized in suspending the engine and drive train relative to the body. Any other components forming part of the driving mechanism and extending from the drive train to the rear wheels will be identified by terminology commonly used in the automotive vehicle art.

In the conventional construction of an automotive vehicle, the body is resiliently suspended with reference to the ground wheels and the engine and drive train are resiliently mounted with reference to the body. The present invention is shown as used with an automotive vehicle in which a "torque tube" type of drive is employed for imparting the driving thrust from the rear wheels to the body, however, the invention could be used with other types of vehicle drives.

The engine mounts must serve the multiple functions of controlling vibrations created as a result of engine operation as well as vibrations transmitted to the body from the road surface over which the vehicle is traveling. The engine mounts are also put to work controlling thrusts or vibrations resulting from the starting and stopping of the vehicle and in the task of alleviating objectionable noises which would otherwise result from the different types of vibrations encountered.

In an effort to construct an automobile having a low silhouette with maximum vertical dimension in the passenger compartment, road clearance (the distance between the underside of the vehicle and ground) must be kept at a minimum. This presents problems of locating the engine mounts in suitable locations for providing needed road clearance while at the same time providing the necessary supporting strength and elastic characterstics for controlling vibrations and noise in an acceptable fashion.

By positioning the rear engine mount sufficiently far to the rear of the engine as to acquire the desired road clearance, the mount is situated an undesirable distance from the rear vibratory nodal point of the engine and drive train and hence problems arise in obtaining the desired flexibility in the mount while accommodating the range of up and down movement of the engine and drive train housing relative to the body.

The principal object of the invention, then, is to provide an engine rear end mounting arrangement in which desired up and down flexibility is obtained while also accommodating the necessary range of up and down forces and fore and aft forces of the engine rear end and drive train relative to the vehicle body.

More specifically, the principal object is accomplished by employing a central resilient mount between the drive train and a transverse beam and additional resilient mounts between the outer ends of the beam and the vehicle body, thereby permitting a controlled range of up and down forces at the central mount between the drive train and the beam and a further range of up and down forces between the beam and the vehicle body by virtue of the beam mounts. A two stage filtering effect is accomplished as a result of this arrangement.

Another object is to provide an engine rear end mounting arrangement in which spaced arms are resiliently mounted with reference to the vehicle body for providing the desired stiffness needed to handle the fore and aft drive thrusts imparted to the vehicle body from the rear wheels while coacting with the adjacent beam mounts for permitting the desired up and down range of forces.

Other objects and advantages of the invention will be apparent from the ensuing specification and accompanying drawings in which:

FIGURE 1 is a schematic side elevational view showing the subject matter of the invention.

FIGURE 2 is a fragmentary schematic plan view of the subject matter of FIGURE 1.

FIGURE 3 is a detail sectional view taken on the line 3—3 of FIGURE 2.

FIGURE 4 is a detail view showing a modified type of the mount shown in FIGURE 3.

FIGURE 5 is a sectional view taken on the line 5—5 of FIGURE 4.

FIGURE 6 is a fragmentary plan view of a portion of the engine mounting apparatus.

FIGURE 7 is a fragmentary sectional view taken on the line 7—7 of FIGURE 6.

FIGURE 8 is a schematic front view of the subject matter of FIGURE 1.

FIGURE 9 is a fragmentary detail sectional view of one of the front engine mounts.

In the schematic showings of FIGURES 1 and 2 I have given identity to the various mounts by using rectangles with inscribed cross marks.

While I have shown individual engine mounts fabricated of rubber (or similar elastomeric material), it will be understood that such mounts could be in the form of springs or other products which would serve satisfactorily to perform the functions of damping vibrations, handling loads, suppressing noise, etc.

It will also be understood that the engine mounting arrangement shown herein will accommodate different combinations of engine and drive train assemblies, such as, V–8 engine with automatic transmission; OHV–6 with standard shift transmission, etc. The combination shown in the drawings happens to be a V–8 engine with automatic transmission.

The engine mounting arrangement may be used with a vehicle employing a type of rear suspension system in which the driving forces from the wheels are not imposed on the mounts, however, vertical flexibility is desired and fore and aft control of engine position is required.

Referring generally to the schematic views of FIGURES 1, 2 and 8, I have shown an automotive vehicle having an engine A of the internal combustion type for driving the drive train indicated generally by the letter B for transmitting drive through a suitable propeller shaft (not shown) housed in the torque tube or propeller shaft housing C which terminates at the differential housing D.

Rear axle accommodating housing E and F extend transversely from either side of the differential housing to the rear ground wheels G.

It will be understood that the engine A provides the driving force through a crankshaft (not shown) which in turn drives the drive train mechanism (not shown) which is housed within the housings 10, 11 and 12. The driving force is transmitted to the propeller shaft, differential gearing, rear axles and then to the rear wheels in a conventional manner, none of which driving mechanism is shown. The driving thrust imparted to the rear wheels is transmitted to the vehicle body to cause movement of the vehicle forwardly or rearwardly as desired. The driving thrust from the rear wheels to the vehicle body is transmitted through the axle housings, propeller shaft housing C and beam 13 into the body sill members 14 and 15, primarily through the mounts 16 and 17, as will be explained more fully hereinafter.

Vertical and horizontal-lateral torque reaction is controlled by a variable rate snubbing feature incorporated in the center rear mount, to be explained more fully hereinafter.

The vehicle body is shown as being of the unitized type in which the structural members are integrally welded with the body panels and the floor pan 19 to form an overall unitary structure. Such a body may include the longitudinally extending transversely spaced side sills 14 and 15, the forward portions 14a and 15a of which, in conjunction with the cross member 18, serve to define the engine compartment. Additional side sills 14b and 15b extend lengthwise along the outermost side walls of the body. The engine mounting arrangement could also be used with a conventional body and separate frame construction.

The forward portion of the engine is suspended with reference to the vehicle body by means of a front cross beam 20 which is rigidly anchored at its opposite ends to the body sills 14 and 15, as by means of welding. Suitable brackets 21 and 22 are anchored to the cross beam 20 and resilient engine mounts, disposed on opposite sides of the engine block 26 and identified generally by the numerals 23 and 24, are interposed between the brackets and the engine block. Viewing FIGURE 8, it will be noted that the elastic axes of mounts 23 and 24 preferably intersect at P in the major principal axis of the engine and drive train, such axis being indicated by the line 30 in FIGURE 1. The arrangement of the front engine mounts is done in a conventional manner and viewing FIGURE 1, it will be noted that such mounts are in the vicinity of the front vibratory nodal point FN. By referring to FIGURE 1, I have shown the axis of rotation of the crankshaft as being situated at the line CS and the front and rear vibratory nodal points of the principal engine bending mode as being located approximately at FN and RN as shown. Thus, the vibration amplitude curve and the mirror image thereof is indicated by the arcuate lines 28 and 29 respectively. The major principal axis of the engine and the drive train, heretofore mentioned, is indicated by the line 30 and such line preferably intersects the resilient central rear mount identified generally by the numeral 31. It will be noted that the rear mount 31 is situated remotely from the rear nodal point and hence a greater amplitude of vibration occurs at this mount.

In order to obtain the desired flexibility in the rear engine mounts, with reference to up and down forces of the of the engine and drive train, the rear central mount 31 is supplemented by employing a cross beam 13, each end of which is secured respectively in the resilient mountings 34 and 35 (shown in detail in FIGURE 7). The mountings 34 and 35 collaborate with mount 31 to provide the desired up and down flexibility.

Increased vibration isolation is accomplished, due to the two stage filter effect, by suitably specifying stiffness and damping of the center and side mounts. The two stage filter effect is achieved by virtue of the cross member or beam 13 functioning as a mass interposed between two resilient mounts, one of which (central mount 31) is situated between the load (engine and drive train) and the mass (beam 13) and the other of which (side mounts 34 and 35) is situated between the mass (beam 13) and the vehicle body (sills 14 and 15).

The mounts 34 and 35, while providing the desired up and down flexibility, do not in themselves provide the necessary strength and stiffness for absorbing fore and aft thrusts lengthwise of the vehicle, such as driving thrust. Hence, the arms 36 and 37 are provided with the additional mounts 16 and 17 for absorbing the fore and aft thrusts as desired. The mounts 16 and 17 while adequately resisting fore and aft thrusts are such as not to interfere with the desired up and down flexibility imparted to the mounting system by the mounts 34 and 35.

Thus, the combination of rear mounts 31, 34, 35, 16 and 17 collaborate to provide a mounting system for achieving desired up and down flexibility while providing the necessary conditions for absorbing fore and aft thrusts, as well as lateral and twisting forces and while providing overload snubbing.

In FIGURES 3, 6, 7 and 9, I have shown, in detail, forms of mountings for accomplishing the desired results.

The central mount 31 may be in the form of an elastic cylindrical sleeve 40 formed of rubber or other elastomeric material. The elastic sleeve encircles a rigid elongated metal bushing 41 and is encased within a cylindrical metal outer sleeve 42.

The cross beam 13 is arched at 43 on either side of the rear central mount 31 and the central portion of the beam at the longitudinal center line of the vehicle body is the lowermost portion of the beam. The under side of the beam in the area at 44 provides suitable clearance while also accommodating the mount 31 beneath the adapter housing 12. The beam which is comprised of upper and lower stampings 45 and 46 includes a central pocket area 47 in the upper stamping to provide the necessary space for the mount 31 between the adapter housing and the beam.

A bracket identified generally by the numeral 48 has side flanges 49 and 50 with an interconnecting base portion 51 which is rigidly anchored, as by means of bolts 54, to the mounting surface 52 of the adapter housing 12. A reinforcing rib 53 may be formed in the base portion 51. The forward end of the bracket may be arched slightly at 56 to provide a suitable clearance area 57 for accommodating the up and down movement permitted by the elastic sleeve 40. A bracket 60 has a semi-cylindrical central portion 61 which engages the sleeve 42 and the pocket 47 in the beam provides a semi-cylindrical surface 62 for engaging the lower half of the sleeve 42. Suitable bolts 63 serve to clamp the mount assembly between the bracket 60 and the beam. The side flanges of the bracket 48 have downwardly directed ears 65 at the forward ends thereof and a bolt 66 extends through the ears and through the bushing 41 for anchoring the mount assembly with refernce to the bracket 48.

The wall thickness of the elastic sleeve 40 together with the hardness of the elastomeric material used accords the desired amount of up and down movement of the engine and drive train with reference to the beam 13, such range of movement being limited because of the distance between the under side of the adapter housing 12 and the ground.

The elastic sleeve 40 is of such length as to provide the desired range of flexibility of the engine and drive train with reference to the vehicle body.

At each end of the beam 13 a bracket 70 is bolted as by means of bolts 71, 72 and 73. A bracket 74 is bolted to each side sill 14 and 15 as by means of bolts 75. Each bracket has an inwardly directed upper and lower flange 76 and 77 for limiting the up and down movement of the ends of the beam with reference to the vehicle body. The mounts 34 and 35 includes the elastic block 78 which is bonded to the rigid metal insert plates 79 and 80, the plate 79 being bolted with reference to the bracket 74 and the side sill by means of the bolts 75 and the metal plate 80 being bolted with reference to bracket 70 by means of bolts 82. The up and down movement of the block 78 and the hardness of the elastomeric material used determines the desired amount of up and down movement of the ends of the beam with reference to the side sills 14 and 15 and the thickness of the block 78 between the plates 79 and 80 provides the desired range of movement of the beam with reference to the side sills in a direction from side to side of the vehicle body. Thus, it can be seen that the elastic sleeve 40 permits a limited amount of up and down movement of the engine and drive train assembly with reference to the beam and the sill mounts 34 and 35 provide an additional range of up and down movement of the beam with reference to the side sills.

In order to provide for the thrust imparted by the rear wheels to the vehicle body for driving the vehicle, the blocks 78 are supplemented by providing arms 36 and 37 at each of the side sills. The arms are generally channel shaped to provide the desired rigidity and strength and the readward end 86 of each arm is interposed between the downwardly depending end wall 87 of the bracket 70 and the metal plate 80 of the elastic mount and the bolts 82 anchor the end of the arm with reference to the elastic block 78 and the beam. The forward end of each arm is struck outwardly to provide an annular flange 90 which receives the mount, identified generally by the numeral 17. The mount includes an exterior cylindrical rigid metal sleeve 91 and a similar internal sleeve 92 through which the bolt 93 passes. A generally U-shaped bracket 95 is secured with reference to the reinforcing channel 96 which in turn is nested within the sill channel of the side sill 15. The mount 17 may be of the type wherein the elastic sleeve 97 is inserted between the inner and outer metal sleeves under pressure. The rubber is under compression which facilitates movement of the sleeve without incurring slippage such as would cause undesirable wear. The wall thickness of the sleeve is such that it will accommodate thrusts (such as are occasioned by the rear wheels imparting driving thrust to the vehicle body). In other words, deflection of the rubber sleeve or bushing in a diametric direction is confined within desired limits while permitting the desired flexibility of the bushing under rotative deflective movements which are occasioned as a result of up and down movement permitted by the sill mounts 78. It will be understood that the mount 17 is similar in detail to the mount 16 on the opposite side of the vehicle and mount 34 is similar to mount 35 on the opposite side of the vehicle.

The front engine mounts 23 and 24 may be of similar construction (as shown in detail in FIGURE 9) comprising the rigid metal plates 100 and 101 which are bonded to the elastic blocks 102 and 103, each of which is bonded to the central metal plate 104. Suitable bolts 105 anchor the mount to one of the brackets 21 and 22 and additional bolts 106 anchor the opposite end of the mount to a mounting plate 107 which in turn is anchored to the cylinder block 26.

Referring to the modified form of rear central mount as shown in FIGURES 4 and 5, I have provided for overload snubbing as mentioned briefly heretofore. The elastic sleeve 40a is positioned between the upper and lower bracket members 60a and 62a and encircles an elongated metal bushing 41a. The elastic sleeve is provided at either end with upwardly projecting ears 110 and 111, the inner faces 112 and 113 of which are spaced slightly from the side flanges 114 and 115 of bracket 60a. Overload snubbing horizontally-laterally is afforded by engagement of a bracket side flange with the sleeve ear adjacent thereto.

The underside of the sleeve is voided in the area identified by the numeral 116 and a rib 117 extends lengthwise of the sleeve. The voiding permits greater flexibility with overload snubbing of vertical and lateral forces imposed on the sleeve. The rib 117 affords overload snubbing of a variable rate for generally vertically directed forces, the rib being subjected to compression against the interior surface of bracket 62a for initial snubbing before additional compression of the sleeve may cause use of the remaining void.

Referring to FIGURE 1, it can be seen that the line 119 passes through the rear center mount at an angle approximately perpendicular to a line 30 passing through the rear center mount and the center of gravity. The line 119 represents the axis of lowest stiffness of the rear center mount. This arrangement provides minimum coupling of the vertical pitching vibration of the engine with fore and aft movement of the engine. An advantage is thereby gained in reducing the vibration induced in the car body from rough road excitation of rear axle vertical vibration, which is transmitted via the torque tube to the engine.

I claim:

1. An automotive vehicle comprising: front and rear ground wheels; a vehicle body suspended relative to the ground wheels; a sill at each side of the body and secure therewith; an engine and associated drive train extending rearwardly therefrom; resilient engine mounts on either side thereof and interposed between the engine and the vehicle body; a substantially rigid beam extending transversely of the vehicle body and being spaced rearwardly from the engine mounts; the opposite ends of the beam terminating short of the sills and lying in a horizontal plane common with the horizontal plane of the sills; elastic beam mounts spaced from each other transversely of the vehicle body and being interposed between the opposite ends of the beam and the sills in longitudinal alignment therewith for resiliently carrying the beam with reference to the vehicle body; a rigid arm anchored at each end of the beam and isolated from the adjacent sill by the elastic beam mount, each arm extending lengthwise of the vehicle body; an elastic arm mount interposed between each arm and the adjacent sill; a resilient drive train mount spaced rearwardly from the engine mounts and situated intermediately with reference to the beam mounts, said drive train mount being interposed between the beam and the drive train.

2. In a vehicle having front and rear ground wheels, a vehicle body suspended relative to the wheels, a sill at each side of the body and secure therewith, an engine housing and an associated drive train housing extending rearwardly from the engine housing toward the rear wheels, a mounting system for supporting the engine housing and drive train housing relative to the vehicle body, said system comprising: an elastic engine housing mounts interposed between the engine housing and the vehicle body; a beam situated rearwardly from the engine housing mounts and extending transversely of the vehicle body, the opposite ends of the beam terminating short of the sills and lying in a horizontal plane common with the horizontal plane of the sills; an elastic drive train housing mount positioned between the beam and the drive train housing; elastic beam mounts at each end of the beam spaced from the engine housing mounts on opposite sides thereof and being interposed between the beam ends and the sills in longitudinal alignment therewith.

3. Apparatus as set forth in claim 2 wherein a bracket is anchored to each sill and each bracket has spaced flanges thereon overhanging a beam end above and below, whereby to limit the range of up and down movement of the beam relative to the vehicle body.

4. In an automotive vehicle having front and rear ground wheels, a vehicle body suspended relative to the wheels, a sill at each side of the body and secure therewith, an engine housing, a drive train housing extending rearwardly from and connected to the engine housing, a propeller shaft housing extending rearwardly from and connected to the drive train housing and a rear axle housing extending transversely of the propeller shaft housing and being connected thereto, a mounting system for suspending the engine housing and drive train housing relative to the vehicle body, said system comprising: an elastic engine housing mount on either side of such housing and being interposed between such housing and the vehicle body; a beam situated rearwardly of the engine housing mounts and beneath the drive train housing, said beam extending transversely of the vehicle body, the opposite ends of the beam terminating short of the sills and lying in a horizontal plane common with the horizontal plane of the sills; an elastic beam mount at each end of the beam in longitudinal alignment therewith and interposed between the beam ends and the sills for carrying the beam relative to the sills; a resilient drive train housing mount interposed between such housing and the beam for carrying such housing relative to the beam.

5. In an automotive vehicle having front and rear ground wheels, a vehicle body suspended relative to the wheels, a sill at each side of the body and secure therewith, an engine housing, a drive train housing extending rearwardly from and connected to the engine housing, a propeller shaft housing extending rearwardly from and connected to the drive train housing and a rear axle housing extending transversely of the propeller shaft housing and being connected thereto, a mounting system for suspending the engine housing and drive train housing relative to the vehicle body, said system comprising: a resilient engine housing mount on either side of such housing and being interposed between such housing and the vehicle body; a beam situated rearwardly of the engine housing mouts and beneath the drive train housing, said beam extending transversely of the vehicle body, the opposite ends of the beam terminating short of the sills and lying in a horizontal plane common with the horizontal plane of the sills; an elastic beam mount at each end of the beam and interposed between the beam end and the adjacent sill in longitudinal alignment therewith for carrying the beam relative to the vehicle body; and arm anchored to each end of the beam and isolated from the adjacent sill by the elastic beam mount, each arm extending lengthwise of the vehicle body; a resilient arm mount interposed between each arm and the vehicle body; an elastic drive train housing mount interposed between such housing and the beam for carrying such housing relative to the beam.

6. Apparatus as set forth in claim 5 wherein the range of movement of the drive train housing accorded by the drive train housing mount for a unit of applied force is greater transversely of the vehicle body than up and down of the vehicle body.

7. Apparatus as set forth in claim 6 wherein the range of movement of the beam accorded by the beam mounts and arm mounts for a unit of applied force is greater up and down of the vehicle body than fore and aft lengthwise of the vehicle body.

8. Apparatus as set forth in claim 7 wherein the arm mounts are in the form of elastic sleeves according a greater range of rotative movement of the arms about the axes of the sleeves per unit of applied force than the range of movement accorded to such arms radially of such sleeves.

9. Apparatus as set forth in claim 6 wherein the drive train housing mount is in the form of an elastic sleeve with its axis directed transversely of the vehicle body and the arm mounts are in the form of elastic sleeves with their axes directed transversely of the vehicle body.

10. Apparatus as set forth in claim 9 wherein one end of each arm is pivotally connected to an adjacent sill.

References Cited by the Examiner
UNITED STATES PATENTS

| | | | |
|---|---|---|---|
| 1,767,015 | 6/1930 | Sardeson et al. | 248—8 |
| 2,208,709 | 7/1940 | Tjaarda | 180—1 |
| 2,311,143 | 2/1943 | Wahlberg | 180—73 |
| 2,365,609 | 12/1944 | Wahlberg | 180—85 |
| 2,953,336 | 9/1960 | Etchells | 248—9 |

FOREIGN PATENTS

| | | |
|---|---|---|
| 679,404 | 9/1952 | Great Britain. |
| 991,043 | 6/1951 | France. |

BENJAMIN HERSH, *Primary Examiner.*

A. HARRY LEVY, *Examiner.*